(12) United States Patent
Sato et al.

(10) Patent No.: US 9,834,256 B2
(45) Date of Patent: Dec. 5, 2017

(54) VEHICLE LOWER PORTION STRUCTURE

(71) Applicant: Toyota Jidosha Kabushiki Kaisha, Toyota-shi (JP)

(72) Inventors: Naoki Sato, Toyota (JP); Yasunori Iwamoto, Toyota (JP); Junichi Yamauchi, Nagakute (JP); Yohsuke Murai, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/205,107

(22) Filed: Jul. 8, 2016

(65) Prior Publication Data
US 2017/0029038 A1 Feb. 2, 2017

(30) Foreign Application Priority Data
Jul. 31, 2015 (JP) .................. 2015-152461

(51) Int. Cl.
*B62D 25/08* (2006.01)
*B62D 21/11* (2006.01)
*B62D 21/15* (2006.01)
*B62D 25/20* (2006.01)

(52) U.S. Cl.
CPC .......... *B62D 25/2018* (2013.01); *B62D 21/11* (2013.01); *B62D 21/155* (2013.01); *B62D 25/08* (2013.01); *B62D 25/084* (2013.01)

(58) Field of Classification Search
CPC .. B62D 25/2018; B62D 25/08; B62D 25/082; B62D 25/084; B62D 25/085; B62D 25/087; B62D 21/11; B62D 21/152; B62D 21/155; B62D 21/157

USPC ............... 296/187.09, 187.1, 193.09, 203.02
See application file for complete search history.

(56) References Cited

U.S. PATENT DOCUMENTS

| 2003/0094803 | A1* | 5/2003 | Fujiki | B62D 21/155 280/784 |
| 2009/0058135 | A1* | 3/2009 | Murata | B62D 21/11 296/187.09 |
| 2011/0095568 | A1* | 4/2011 | Terada | B62D 21/11 296/187.09 |
| 2011/0133512 | A1* | 6/2011 | Mildner | B60R 19/36 296/187.09 |

(Continued)

FOREIGN PATENT DOCUMENTS

| JP | 2008-195094 | 8/2008 |
| JP | 2009-061887 A | 3/2009 |

(Continued)

*Primary Examiner* — Gregory Blankenship
(74) *Attorney, Agent, or Firm* — Oblon, McClelland, Maier & Neustadt, L.L.P.

(57) ABSTRACT

A vehicle lower portion structure that includes: a suspension member that does not have a section that interconnects, in a vehicle width direction, a vehicle front-side end portion of a side rail placed on one vehicle width direction side and a vehicle front-side end portion of a side rail placed on the other vehicle width direction side; and a pair of right and left coupling portions that respectively interconnect the vehicle front-side end portion of the side rail placed on the one vehicle width direction side and a heat exchanger support lower member and interconnect the vehicle front-side end portion of the side rail placed on the other vehicle width direction side and the heat exchanger support lower member.

7 Claims, 7 Drawing Sheets

(56) References Cited

U.S. PATENT DOCUMENTS

| | | | | |
|---|---|---|---|---|
| 2011/0241385 A1* | 10/2011 | Baccouche | B62D 21/152 | 296/203.02 |
| 2012/0161473 A1* | 6/2012 | Schaefer | B60R 19/12 | 296/187.09 |
| 2013/0200653 A1* | 8/2013 | Yasui | B62D 21/11 | 296/187.08 |
| 2014/0152051 A1* | 6/2014 | Saitou | B62D 21/15 | 296/187.09 |
| 2014/0326526 A1* | 11/2014 | Yasui | B62D 21/11 | 180/274 |
| 2015/0251613 A1* | 9/2015 | Mori | B60R 19/18 | 296/187.09 |
| 2015/0298742 A1* | 10/2015 | Ono | B62D 21/11 | 296/187.09 |
| 2015/0360633 A1* | 12/2015 | Nishida | B62D 21/152 | 293/133 |
| 2016/0023681 A1* | 1/2016 | Fujikawa | B62D 25/082 | 296/187.09 |
| 2016/0046250 A1* | 2/2016 | Sotoyama | B62D 21/152 | 293/155 |
| 2016/0068193 A1* | 3/2016 | Koike | B62D 25/2045 | 296/187.09 |
| 2016/0107695 A1* | 4/2016 | Lee | B62D 25/082 | 296/187.09 |
| 2016/0221608 A1* | 8/2016 | Hiramatsu | B62D 25/082 | |
| 2016/0236718 A1* | 8/2016 | Tatsuwaki | B62D 21/155 | |
| 2016/0311468 A1* | 10/2016 | Groen | B62D 21/11 | |
| 2016/0375938 A1* | 12/2016 | Matsuo | B62D 21/11 | 296/204 |
| 2017/0029038 A1* | 2/2017 | Sato | B62D 25/2018 | |
| 2017/0050676 A1* | 2/2017 | Daigaku | B62D 25/082 | |

FOREIGN PATENT DOCUMENTS

| | | |
|---|---|---|
| JP | 2009-126266 | 6/2009 |
| JP | 2013-256162 | 12/2013 |

* cited by examiner

VEHICLE LOWER PORTION STRUCTURE

CROSS-REFERENCE TO RELATED APPLICATIONS

This application is based on and claims priority under 35 USC 119 from Japanese Patent Application No. 2015-152461 filed on Jul. 31, 2015, which is incorporated by reference herein.

BACKGROUND

Technical Field

The present invention relates to a vehicle lower portion structure.

Related Art

Japanese Patent Application Laid-open (JP-A) No. 2013-256162 discloses a vehicle lower portion structure for a vehicle front portion equipped with a pair of right and left front side members, which extend in the vehicle front and rear direction on both vehicle width direction sides of the vehicle front portion, and a suspension member, which is supported via suspension supports on the pair of right and left front side members. Furthermore, the suspension member is formed in a rectangular frame shape by virtue of having a pair of right and left side members (side rails) that are placed apart from each other in the vehicle width direction, a cross member (a front-side cross member) that interconnects in the vehicle width direction the vehicle front-side end portions of the pair of right and left side members, and a cross member that interconnects in the vehicle width direction the vehicle rear-side end portions of the pair of right and left side members.

In a configuration having the front-side cross member that interconnects in the vehicle width direction the vehicle front-side end portions of the pair of right and left side members, twisting and deflection of the vehicle front-side end portions of the pair of right and left side members are controlled. Because of this, vibration transmitted from the suspension member to the front side members is reduced.

However, although the configuration having the front-side cross member is effective from the standpoint of reducing vibration transmitted from the suspension member to the front side members, there is room for improvement from the standpoint of controlling an increase in the weight of the lower portion of the vehicle.

SUMMARY OF THE INVENTION

In consideration of the circumstances described above, it is an object of the present disclosure to obtain a vehicle lower portion structure that can reduce vibration transmitted from the suspension member to the front side members while controlling an increase in the weight of the lower portion of the vehicle.

A vehicle lower portion structure of a first aspect includes: a pair of right and left front side members that are placed apart from each other in the vehicle width direction in a vehicle front portion and are disposed extending in the vehicle front and rear direction; a heat exchanger support lower member that extends in the vehicle width direction and configures a region on the vehicle lower side of a heat exchanger support that supports a heat exchanger disposed in the vehicle front portion; a suspension member having a pair of right and left side rails that are placed on the vehicle lower side of the pair of right and left front side members, are supported on the pair of right and left front side members, are placed apart from each other in the vehicle width direction, and extend in the vehicle front and rear direction, with the suspension member not having a section that interconnects in the vehicle width direction the vehicle front-side end portion of the side rail placed on one vehicle width direction side and the vehicle front-side end portion of the side rail placed on the other vehicle width direction side, and a pair of right and left coupling portions that respectively interconnect the vehicle front-side end portion of the side rail placed on the one vehicle width direction side and the heat exchanger support lower member and interconnect the vehicle front-side end portion of the side rail placed on the other vehicle width direction side and the heat exchanger support lower member.

According to the vehicle lower portion structure of the first aspect, the suspension member where the vehicle front-side end portions of the pair of right and left side rails are not interconnected in the vehicle width direction is supported on the front side members. The configuration of the suspension member is such that the vehicle front-side end portions of the pair of right and left side rails twist or easily deflect. For that reason, it is difficult to reduce vibration transmitted from the suspension member to the front side members. However, in the present invention, the vehicle front-side end portions of the pair of right and left side rails configuring part of the suspension member and the heat exchanger support lower member configuring part of the heat exchanger support that supports the heat exchanger are interconnected via the pair of right and left coupling portions. That is, the vehicle front-side end portions of the pair of right and left side rails are interconnected in the vehicle width direction via the pair of right and left coupling portions and the heat exchanger support lower member. Because of this, twisting and deflection of the vehicle front-side end portions of the pair of right and left side rails configuring part of the suspension member can be controlled while controlling an increase in the weight of the suspension member. As a result, in the present invention, vibration transmitted from the suspension member to the front side members can be reduced while controlling an increase in the weight of the lower portion of the vehicle.

A vehicle lower portion structure of a second aspect is the vehicle lower portion structure of the first aspect, wherein the vehicle front-side end portion of the side rail placed on the one vehicle width direction side is secured to the front side member placed on the one vehicle width direction side, the vehicle front-side end portion of the side rail placed on the other vehicle width direction side is secured to the front side member placed on the other vehicle width direction side, and regions of the pair of right and left coupling portions between regions secured to the heat exchanger support lower member and regions secured to the side rails are sloped outward in the vehicle width direction heading toward the vehicle rear side as seen in a vehicle plan view.

According to the vehicle lower portion structure of the second aspect, the regions (hereinafter these regions will be called "middle portions") of the pair of right and left coupling portions between the regions secured to the heat exchanger support lower member and the regions secured to the side rails are sloped in the way described above. Because of this, twisting, whose axial direction coincides with the vehicle front and rear direction, of the vehicle front-side end portions of the pair of right and left side rails configuring part of the suspension member can be effectively controlled compared to a configuration where the middle portions of the coupling portions extend in the vehicle front and rear direction. Furthermore, in a configuration where the middle portions of the pair of right and left coupling portions are sloped in the way described above, when an external force heading toward the vehicle rear side has been input to the heat exchanger support lower member, a rotational force about the regions of the coupling portions secured to the side rails can be produced in the coupling portions. Because of this, when an external force heading toward the vehicle rear side has been input to the heat exchanger support lower member, it can be made easier for the coupling portions to tilt (turn) about the regions secured to the side rails or for the middle portions of the coupling portions to undergo bending deformation. As a result, in the present invention, at the time of a frontal crash, for example, the region on the vehicle lower side of the heat exchanger can be moved backward toward the vehicle rear side.

A vehicle lower portion structure of a third aspect is the vehicle lower portion structure of the second aspect, wherein heat exchanger anchoring portions to which part of the heat exchanger is anchored are disposed in the heat exchanger support lower member, and the pair of right and left coupling portions are secured to regions of the heat exchanger support lower member that are adjacent to the heat exchanger anchoring portions.

According to the vehicle lower portion structure of the third aspect, when an external force heading toward the vehicle rear side is input to the heat exchanger, the external force is transmitted from the heat exchanger to the heat exchanger anchoring portions disposed in the heat exchanger support lower member. Here, in the present disclosure, the pair of right and left coupling portions are secured to regions of the heat exchanger support lower member that are adjacent to the heat exchanger anchoring portions. Because of this, when the external force has been transmitted to the heat exchanger anchoring portions of the heat exchanger support lower member, it can be made easier for the coupling portions to quickly tilt (turn) about the regions secured to the side rails or for the middle portions of the coupling portions to quickly undergo bending deformation. As a result in the present invention, at the time of a frontal crash, for example, the region on the vehicle lower side of the heat exchanger can be quickly moved backward toward the vehicle rear side.

A vehicle lower portion structure of a fourth aspect is the vehicle lower portion structure of the second aspect or the third aspect, wherein weak portions are formed in the regions of the pair of right and left coupling portions between the regions secured to the heat exchanger support lower member and the regions secured to the side rails.

According to the vehicle lower portion structure of the fourth aspect, the weak portions are formed in the middle portions of the pair of right and left coupling portions. For that reason, when an external force heading toward the vehicle rear side is input to the heat exchanger support lower member, it is easier for the coupling portions to become deformed starting at the weak portions or the peripheral edge portions thereof. Because of this, in the present disclosure, at the time of a frontal crash, for example, the region on the vehicle lower side of the heat exchanger can be quickly moved backward toward the vehicle rear side.

DESCRIPTION OF EMBODIMENTS

Figure 1:
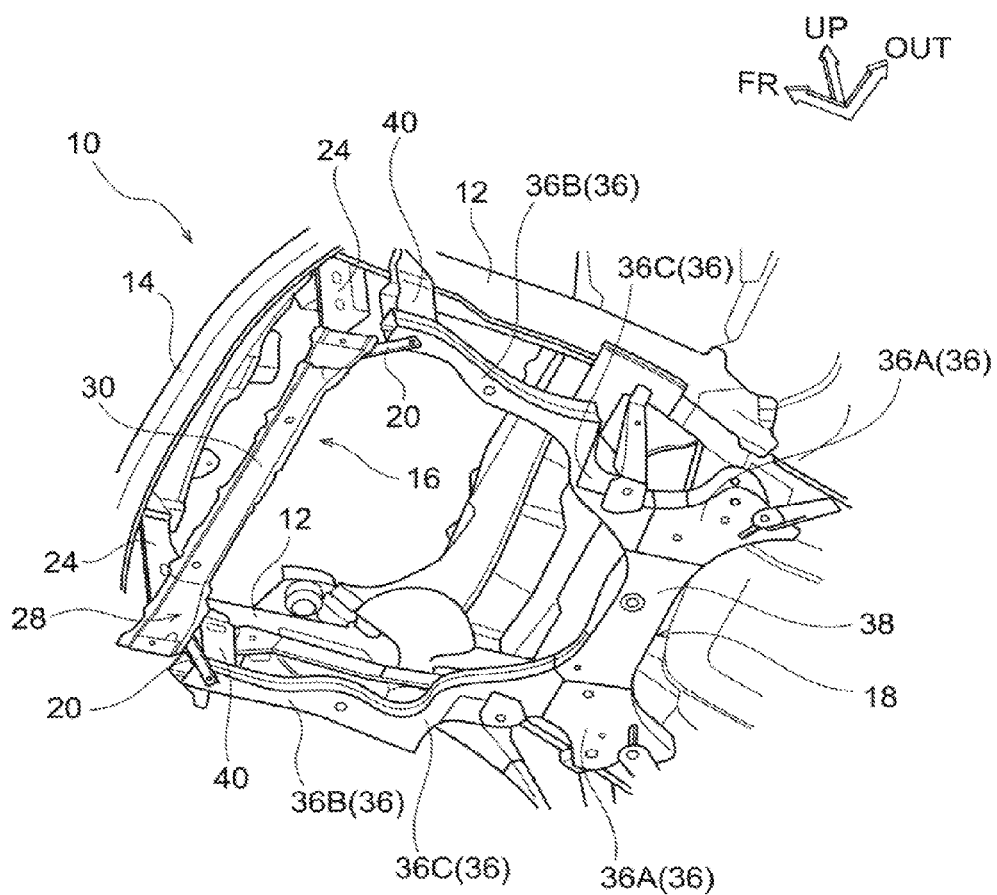
FIG. 1 is a perspective view, seen obliquely from a vehicle lower side, of a front portion of a vehicle to which a vehicle lower portion structure of an embodiment has been applied.

A vehicle lower portion structure pertaining to an embodiment of the present disclosure will be described using FIG. 1 to FIG. 5. It should be noted that arrow FR, arrow UP, and arrow OUT appropriately shown in the drawings indicate a forward direction (traveling direction) of the vehicle, an upward direction, and an outward direction in the vehicle width direction. Furthermore, below, when description is given simply using the directions of front and rear, right and left, and up and down, unless otherwise specified these will be understood to mean front and rear in the vehicle front and rear direction, right and left in the vehicle right and left direction (vehicle width direction), and up and down in the vehicle up and down direction.

Figure 2:
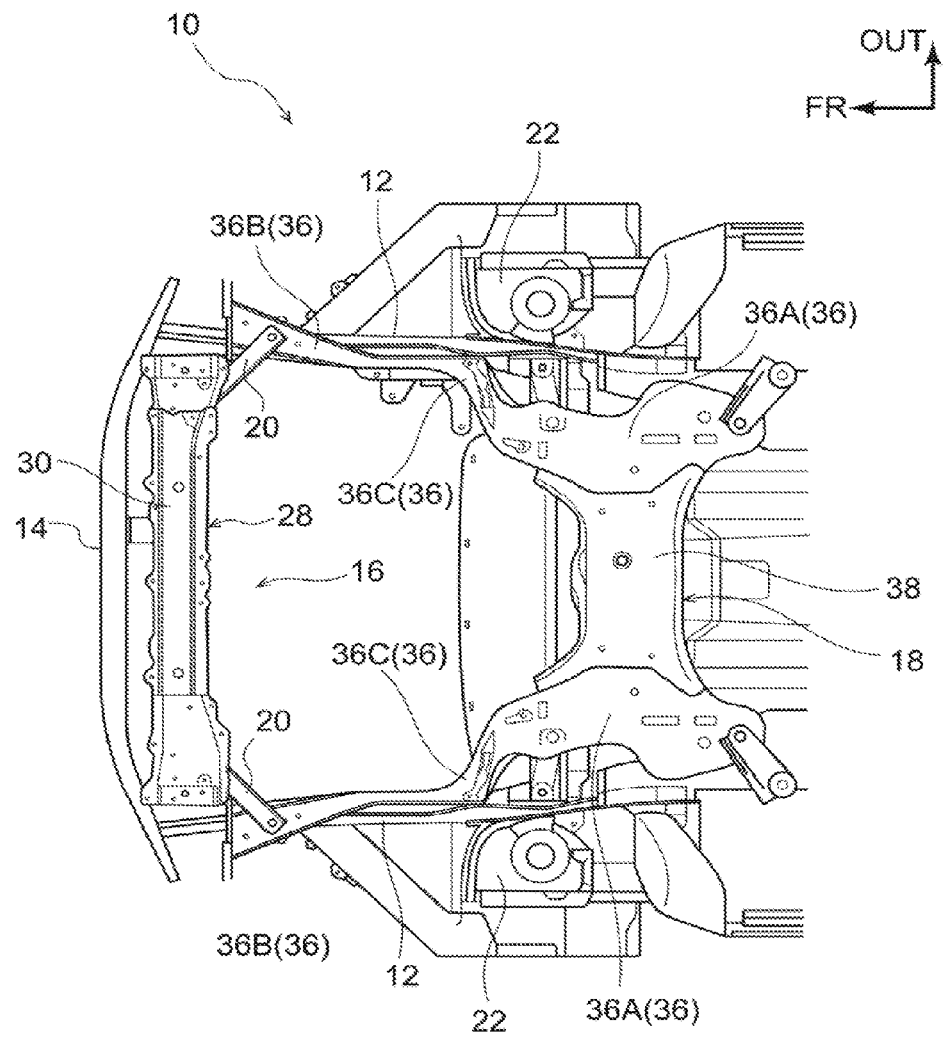
FIG. 2 is a bottom view, seen from the vehicle lower side, of the front portion of the vehicle to which the vehicle lower portion structure of the embodiment has been applied.
Figure 3:
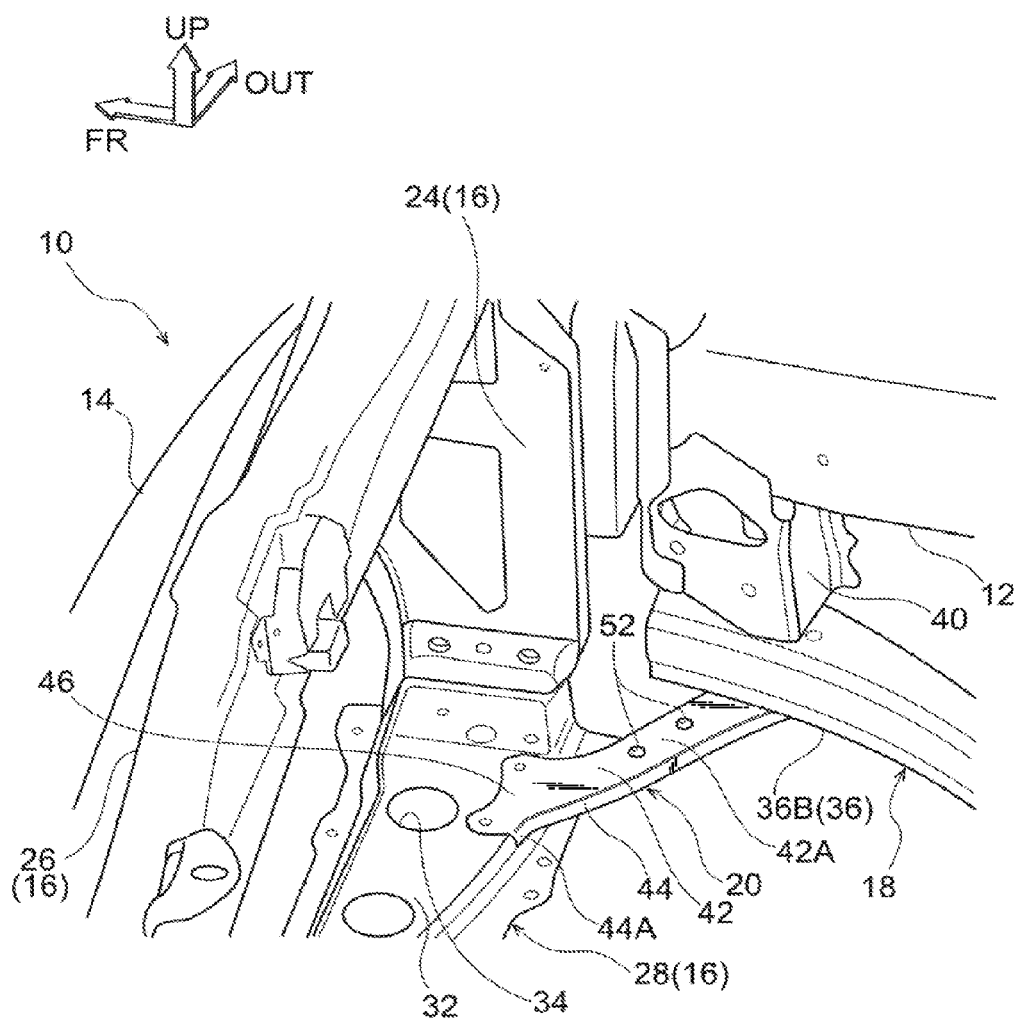
FIG. 3 is an enlarged perspective view, seen from an engine compartment side, of the area around a front end portion of a right-side side rail configuring part of a suspension member.

FIG. 1 to FIG. 3 show a front portion 10 of a vehicle body to which the vehicle lower portion structure of the present embodiment has been applied. It should be noted that the state of the front portion 10 of the vehicle body shown in FIG. 1 to FIG. 3 is a state before a fender panel and a bumper cover are attached thereto. As shown in FIG. 1, the front portion 10 of the vehicle body is equipped with a pair of right and left front side members 12, which are placed apart from each other in the vehicle width direction and are disposed extending in the vehicle front and rear direction, and a bumper reinforcement 14, which is attached to the front end portions of the pair of right and left front side members 12. Furthermore, the front portion 10 of the vehicle body is equipped with a radiator support 16 serving as a heat exchanger support that is placed on the rear side of the bumper reinforcement 14 and supports a heat exchanger such as a radiator. Moreover, the front portion 10 of the vehicle body is equipped with a suspension member 18, to which suspension arms and a steering gearbox are attached. Furthermore, the front portion 10 of the vehicle body is equipped with a pair of right and left braces 20 serving as coupling portions that interconnect the radiator support 16 and the suspension member 18.

The front side member 12 placed on one vehicle width direction side (the right side) and the front side member 12 placed on the other vehicle width direction side (the left side) are symmetrically formed in the vehicle width direction. The pair of right and left front side members 12 are each formed in a rectangular cross section as seen in a vehicle front view. Furthermore, each of the front side members 12 is, for example, formed as a result of an inner panel placed on the vehicle width direction inside and extending along the front and rear direction and an outer panel placed on the vehicle width direction outside with respect to the inner panel and extending along the front and rear direction being joined to each other. A power unit is secured via a power unit mount to the front side members 12 described above. Furthermore, suspension towers 22 (see FIG. 2), to which upper end portions of coilovers are secured, are secured to the right-side front side member 12 and the left-side front side member 12.

The bumper reinforcement 14 is formed in a substantially rectangular cross section as seen in a vehicle side view and extends in such a way that its longitudinal direction coincides with the vehicle width direction inside the bumper cover. Furthermore, the bumper reinforcement 14 is attached to the front end portions of the front side members 12 via crash boxes. Because of this, the front end portion of the right-side front side member 12 and the front end portion of the left-side front side member 12 are interconnected in the vehicle width direction via the bumper reinforcement 14.

The radiator support 16 is formed in a substantially rectangular frame shape as seen in a vehicle front view. The radiator support 16 is equipped with a pair of right and left radiator support side members 24 serving as heat exchanger support side members that are placed apart from each other in the vehicle width direction and extend in the up and down direction. Furthermore, the radiator support 16 is equipped with a radiator support upper member 26 (see FIG. 3), which serves as a heat exchanger support upper member that interconnects in the vehicle width direction the upper end portions of the pair of right and left radiator support side members 24, and a radiator support lower member 28, which serves as a heat exchanger support lower member that interconnects in the vehicle width direction the lower end portions of the pair of right and left radiator support side members 24. The pair of right and left radiator support side members 24 are placed on the vehicle width direction inside of the pair of right and left front side members 12 and are secured to the front end portions of the pair of right and left front side members 12. Furthermore, as shown in FIG. 3, both vehicle width direction end portions of the radiator support upper member 26 are secured via bolts and nuts, for example, to the upper end portions of the pair of right and left radiator support side members 24. Moreover, the radiator support lower member 28 is formed as a result of a lower panel 30 (see FIG. 2) extending along the vehicle width direction and an upper panel 32 placed on the upper side of the lower panel 30 and extending along the vehicle width direction being joined to each other. Furthermore, radiator anchoring holes 34 serving as heat exchanger anchoring portions are formed in a region on the right-side radiator support side member 24 side and a region on the left-side radiator support side member 24 side of the upper panel 32 configuring part of the radiator support lower member 28. Additionally, anchoring portions disposed on the radiator are anchored in the radiator anchoring holes 34, so that the lower end portion of the radiator is supported on the radiator support lower member 28. It should be noted that bushes formed using a viscoelastic material such as rubber are interposed between the anchoring portions of the radiator and the radiator anchoring holes 34.

As shown in FIG. 1, the suspension member 18 is placed on the lower side of the front side members 12 and is supported on the front side members 12. As shown in FIG. 2, the suspension member 18 is formed in a substantially H-shape as seen in a vehicle bottom view. Specifically, the suspension member 18 is equipped with a pair of right and left side rails 36, which are placed apart from each other in the vehicle width direction and extend in the vehicle front and rear direction, and a rear-side cross member 38, which interconnects in the vehicle width direction the vehicle rear-side regions of the pair of right and left side rails 36. The right-side side rail 36 and the left-side side rail 36 are symmetrically formed in the vehicle width direction. The side rails 36 are equipped with rear-side extension portions 36A that are interconnected in the vehicle width direction by the rear-side cross member 38, front-side extension portions 36B that are placed on the front side of the rear-side extension portions 36A and are placed overlapping in the up and down direction the right-side front side member 12 or the left-side front side member 12, and middle extension portions 36C that interconnect the rear-side extension portions 36A and the front-side extension portions 36B. Furthermore, the regions on the rear side of the suspension member 18—i.e., the rear-side extension portions 36A of the side rails 36—are secured via bolts, for example, to regions on the rear side of the front side members 12. Moreover, the front end portions of the suspension member 18—i.e., the front end portions of the front-side extension portions 36B of the side rails 36—are secured via suspension supports 40 to the front-side end portions of the front side members 12.

The pair of right and left braces 20 are formed by stamping steel plates, for example. It should be noted that the right-side brace 20 and the left-side brace 20 are symmetrically formed in the vehicle width direction, so below, the right-side brace 20 will be described and description of the left-side brace 20 will be omitted.

Figure 4:
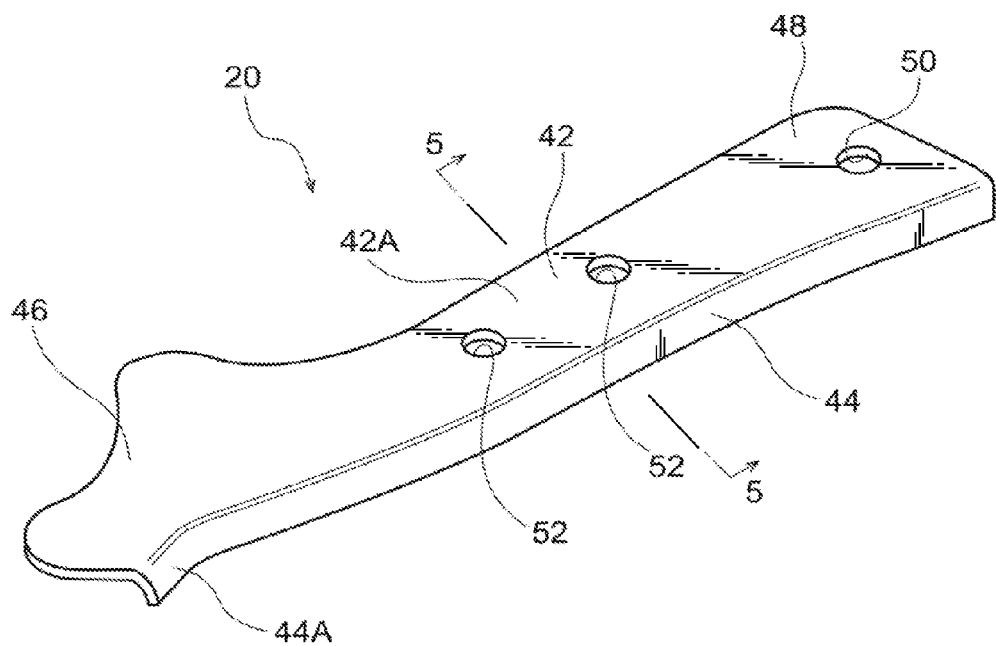
FIG. 4 is an enlarged perspective view showing a brace that interconnects side rails of the suspension member and a radiator support lower member.
Figure 5:
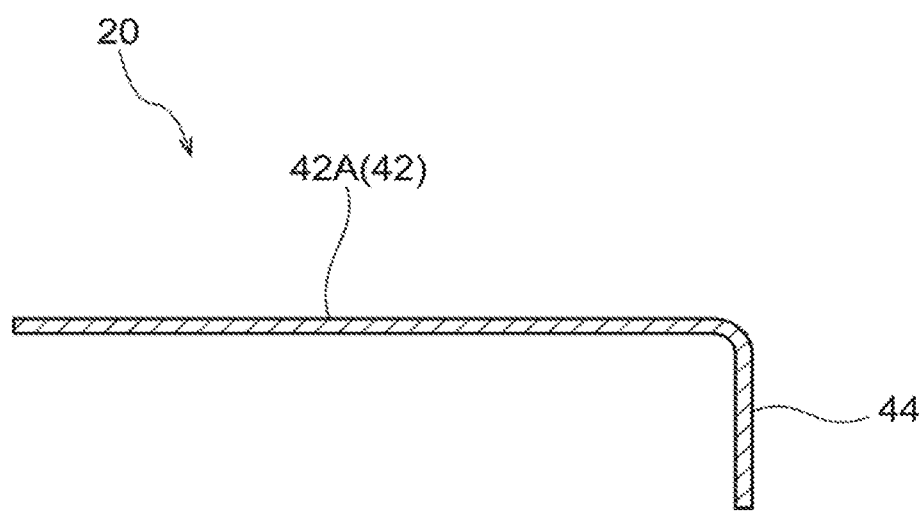
FIG. 5 is a cross-sectional view showing a cross section of the brace cut along line 5-5 shown in FIG. 4.

As shown in FIG. 3, the right-side brace 20 interconnects the front end portion of the right-side side rail 36 (the front-side extension portion 36B) of the suspension member 18 and the right-side end portion of the radiator support lower member 28. As shown in FIG. 4 and FIG. 5, the right-side brace 20 is equipped with a general portion 42, which is shaped like a rectangular plate, extends in such a way that its thickness direction coincides with the vehicle up and down direction, and is sloped outward (rightward) in the vehicle width direction heading rearward as seen in a vehicle plan view, and a flange portion 44, which is formed as a result of the vehicle width direction inside end portion of the general portion 42 being bent downward.

As shown in FIG. 4, an end portion on one side (the front end portion) of the general portion 42 serves as a first securing portion 46 that is secured to the right-side end portion of the radiator support lower member 28. As shown in FIG. 3, the first securing portion 46 is joined by spot welding to the surface on the upper side of the radiator support lower member 28 in a state in which the first securing portion 46 has been placed on the peripheral edge portion of the radiator anchoring hole 34 and on the rear side of the radiator anchoring hole 34. It should be noted that, in the present embodiment, the first securing portion 46 is spot welded in two places apart from each other in the vehicle width direction. Furthermore, in a state in which the first securing portion 46 has been joined to the surface on the upper side of the radiator support lower member 28, a front end portion 44A of the flange 44 is in contact with the radiator support lower member 28.

As shown in FIG. 3 and FIG. 4, the end portion on the other side (the rear end portion) of the general portion 42 serves as a second securing portion 48 that is secured to the front end portion of the side rail 36 (the front-side extension portion 36B) of the suspension member 18. Furthermore, a bolt insertion hole 50, through which a bolt is inserted, is formed in the second securing portion 48. Additionally, the second securing portion 48 is secured to the front end portion of the side rail 36 as a result of a bolt inserted through the bolt insertion hole 50 being screwed into a weld nut secured to the front end portion of the side rail 36 in a state in which the second securing portion 48 has been placed along the surface on the lower side of the front end portion of the side rail 36 of the suspension member 18.

Furthermore, two cored holes 52 serving as weak portions are formed in a region 42A of the general portion 42 between the first securing portion 46 and the second securing portion 48. Furthermore, the two cored holes 42A are arranged adjacent to each other in the longitudinal direction of the general portion 42.

Action and Effects of the Present Embodiment

Next, the action and effects of the present embodiment will be described.

As shown in FIG. 1 to FIG. 3, in the front portion 10 of the vehicle body to which the vehicle lower portion structure of the present embodiment has been applied, the suspension member 18 that is not equipped with a section interconnecting in the vehicle width direction the front end portions of the pair of right and left side rails 36 is supported on the front side members 12. The configuration of the suspension member 18 is such that the front end portions of the pair of right and left side rails 36 twist or easily deflect. For that reason, it is difficult to reduce vibration transmitted from the suspension member 18 to the front side members 12.

However, in the present embodiment, the front end portions of the pair of right and left side rails 36 configuring part of the suspension member 18 and the radiator support lower member 28 configuring part of the radiator support 16 that supports the radiator are interconnected via the pair of right and left braces 20. That is, the front end portions of the pair of right and left side rails 36 are interconnected in the vehicle width direction via the pair of right and left braces 20 and the radiator support lower member 28. Because of this, twisting and deflection of the front end portions of the pair of right and left side rails 36 configuring part of the suspension member 18 can be controlled while controlling an increase in the weight of the suspension member 18. As a result, in the present embodiment, vibration transmitted from the suspension member 18 to the front side members 12 can be reduced while controlling an increase in the weight of the lower portion of the vehicle.

Figure 7:
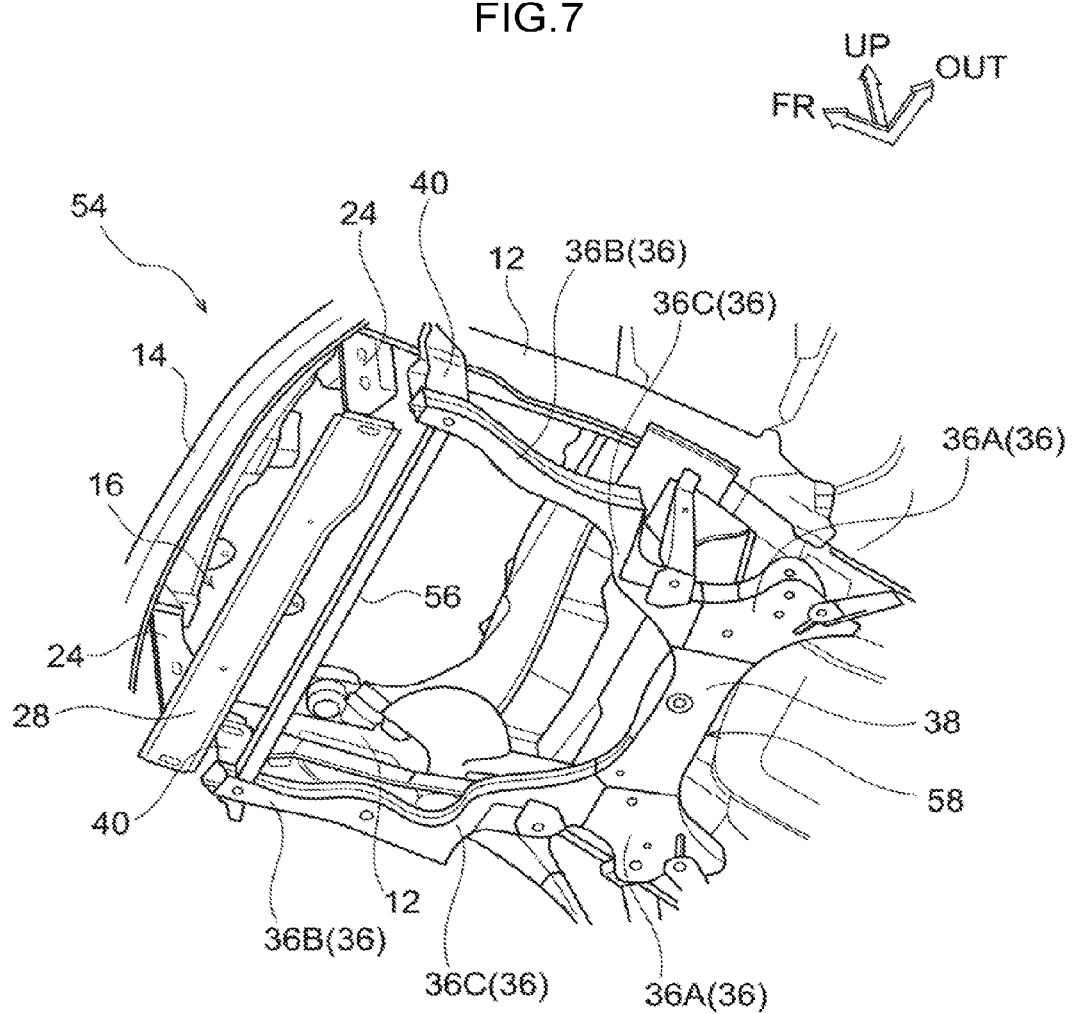
FIG. 7 is a perspective view, corresponding to FIG. 1 and seen obliquely from the vehicle lower side, of a front portion of a vehicle pertaining to a contrasting example.

In contrast, as shown in FIG. 7, in a front portion 54 of a vehicle body to which a vehicle lower portion structure pertaining to a contrasting example has been applied, a suspension member 58 where the front end portions of the pair of right and left side rails 36 are interconnected in the vehicle width direction via a front-side cross member 56 is supported on the front side members 12. In the configuration of the suspension member 58, it is difficult for twisting and deflection to occur in the front end portions of the pair of right and left side rails 36, but the weight of the suspension member 58 itself increases. That is, in the front portion 54 of the vehicle body to which the vehicle lower portion structure pertaining to the contrasting example has been applied, vibration transmitted from the suspension member 58 to the front side members 12 can be reduced, but it is difficult to control an increase in the weight of the lower portion of the vehicle.

Furthermore, as shown in FIG. 1 to FIG. 3, in the present embodiment, the regions 42A (hereinafter these regions will be called "middle portions of the braces 20") of the general portions 42 of the pair of right and left braces 20 between the first securing portions 46 and the second securing portions 48 are sloped outward in the vehicle width direction heading rearward as seen in a plan view. Because of this, twisting, whose axial direction coincides with the vehicle front and rear direction, of the front end portions of the pair of right and left side rails 36 configuring part of the suspension member 18 can be effectively controlled compared to a configuration where the middle portions of the braces 20 extend in the vehicle front and rear direction. Furthermore, in a configuration where the middle portions of the braces 20 are sloped in the way described above, when an external force heading toward the vehicle rear side has been input to the radiator support lower member 28, a rotational force about the regions (the second securing portions 48) of the braces 20 secured to the side rails 36 can be produced in the braces 20. Because of this, when an external force heading toward the vehicle rear side has been input to the radiator support lower member 28, it can be made easier for the braces 20 to tilt (turn) about the second securing portions 48 or for the middle portions of the braces 20 to undergo bending deformation. As a result, in the present embodiment, at the time of a frontal crash, for example, the region on the vehicle lower side of the radiator can be moved backward toward the vehicle rear side.

Moreover, in the present embodiment, when an external force heading toward the vehicle rear side is input to the radiator, the external force is transmitted from the radiator to the peripheral edge portions of the radiator anchoring holes 34 disposed in the radiator support lower member 28. Here, in the present embodiment, the first securing portions 46 of the pair of right and left braces 20 are secured to the rear sides of the peripheral edge portions of the radiator anchoring holes 34. Because of this, when the external force has been transmitted to the peripheral edge portions of the radiator anchoring holes 34 disposed in the radiator support lower member 28, it can be made easier for the braces 20 to quickly tilt (turn) about the second securing portions 48 or for the middle portions of the braces 20 to quickly undergo bending deformation. As a result, in the present embodiment, at the time of a frontal crash, for example, the region on the vehicle lower side of the radiator can be quickly moved backward toward the vehicle rear side.

Furthermore, in the present embodiment, the two cored holes 52 are formed in the regions 42A of the general portions 42 of the braces 20 between the first securing portions 46 and the second securing portions 48. For that reason, when an external force heading toward the vehicle rear side is input to the radiator support lower member 28, it is easier for the braces 20 to become deformed starting at the cored holes 52 or the peripheral edge portions thereof. Because of this, in the present embodiment, at the time of a frontal crash, for example, the region on the vehicle lower side of the radiator can be quickly moved backward toward the vehicle rear side.

It should be noted that although in the present embodiment an example has been described where the two cored holes 52 are formed in the regions 42A of the general portions 42 of the braces 20 between the first securing portions 46 and the second securing portions 48, the present invention is not limited to this. For example, instead of the cored holes 52, weak portions such as bent portions or cutout portions may also be formed in the regions 42A of the general portions 42 of the braces 20 between the first securing portions 46 and the second securing portions 48. Furthermore, the braces 20 can also be given a configuration in which weak portions are not formed in them. Moreover, in the present embodiment, an example has been described where the first securing portions 46 of the pair of right and left braces 20 are secured to the peripheral edge portions of the radiator anchoring holes 34, but the present invention is not limited to this. In this way, it suffices to appropriately set, in consideration of the trajectory of the radiator at the time of a crash, the type of and whether or not to dispose weak portions, and whether or not to secure the first securing portions 46 of the pair of right and left braces 20 to the peripheral edge portions of the radiator anchoring holes 34.

Braces Pertaining to Example Modification

Figure 6:
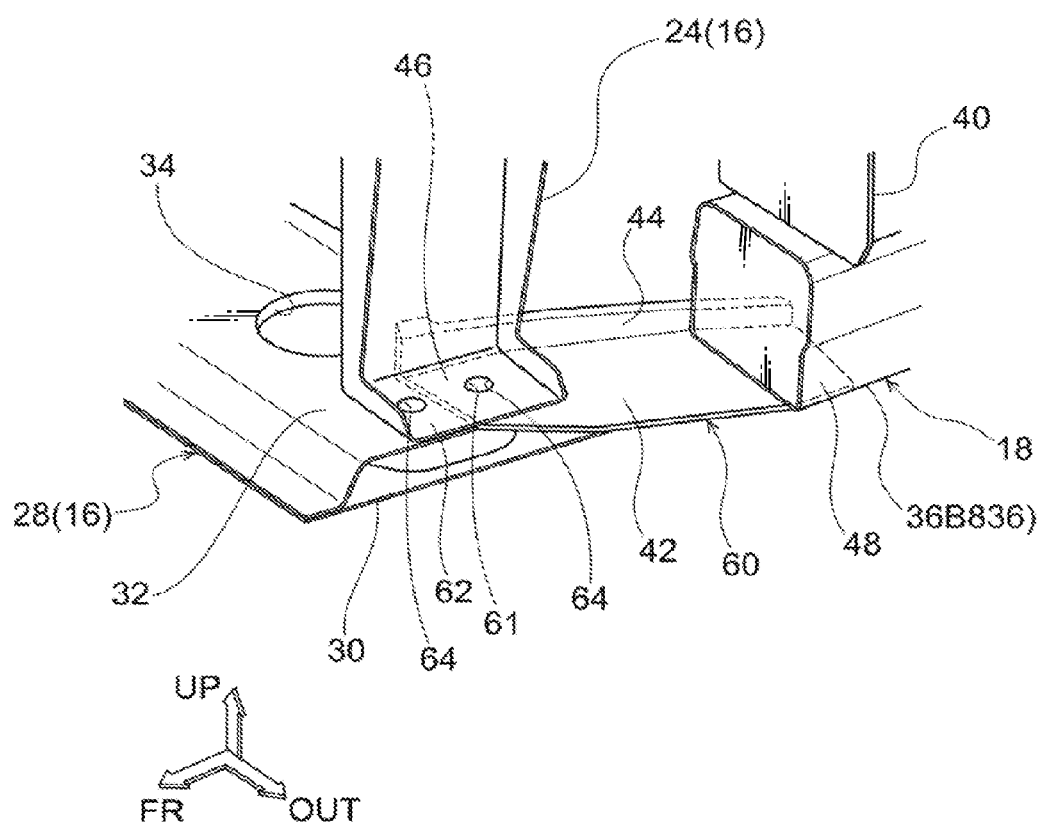
FIG. 6 is an enlarged perspective view showing a state in which a brace pertaining to an example modification is secured to a side rail of the suspension member and the radiator support lower member.

Next, braces 60 pertaining to an example modification of the above embodiment will be described using FIG. 6. It should be noted that sometimes the same reference signs as those in the above embodiment will be assigned to members and sections corresponding to those in the above embodiment and that description of those corresponding members and sections will be omitted. Furthermore, the right-side brace 60 and the left-side brace 60 are symmetrically formed in the vehicle width direction, so below, the left-side brace 60 will be described and description of the right-side brace 60 will be omitted.

In this example modification, part of the brace 60 is secured to the radiator support lower member 28 in a state in which the first securing portion 46 of the brace 60 is sandwiched and held between the radiator support lower member 28 and the radiator support side member 24. Specifically, the lower end portion of the radiator support side member 24 serves as a joint portion 62 bent outward in the vehicle width direction, and two bolt insertion holes 64 placed apart from each other in the front and rear direction are formed in the joint portion 62. Furthermore, a single bolt insertion hole 61 is formed in the first securing portion 46 of the brace 60. Additionally, a bolt inserted through the front-side bolt insertion hole 64 formed in the joint portion 62 is screwed into a weld nut joined to the radiator support lower member 28 in a state in which the first securing portion 46 of the brace 60 has been placed between the radiator support lower member 28 and the joint portion 62 of the radiator support side member 24. Moreover, a bolt inserted through the rear-side bolt insertion hole 62 formed in the joint portion 62 and the bolt insertion hole 61 formed in the first securing portion 46 of the brace 60 is screwed into a weld nut joined to the radiator support lower member 28. Because of this, the first securing portion 46 of the brace 60 is sandwiched and held between the radiator support lower member 28 and the radiator support side member 24, and the lower end portion of the radiator support side member 24 is secured to the radiator support lower member 28.

According to the brace 60 pertaining to the example modification described above, parts of the pair of right and left braces 60 can be secured to the radiator support lower member 28 using members (bolts) that join the radiator support lower member 28 and the radiator support side members 24 to each other.

An embodiment of the present invention has been described above, but the present invention is not limited to what is described above and can be modified and implemented in a variety of ways other than described above without departing from the spirit thereof.

The vehicle lower portion structure of the present disclosure can reduce vibration transmitted from the suspension member to the front side members while controlling an increase in the weight of the lower portion of the vehicle.

The invention claimed is:

1. A vehicle lower portion structure comprising:
   a pair of right and left front side members that are placed apart from each other in a vehicle width direction at a vehicle front portion and are disposed extending in a vehicle front and rear direction;
   a heat exchanger support lower member that extends in the vehicle width direction and configures a region on a vehicle lower side of a heat exchanger support that supports a heat exchanger disposed in the vehicle front portion;
   a suspension member having a pair of right and left side rails that are placed on the vehicle lower side of the pair of right and left front side members, are supported on the pair of right and left front side members, are placed apart from each other in the vehicle width direction, and extend in the vehicle front and rear direction, with the suspension member not having a section that interconnects, in the vehicle width direction, a vehicle front-side end portion of the right side rail placed on one vehicle width direction side and a vehicle front-side end portion of the left side rail placed on the other vehicle width direction side;
   a first coupling portion that interconnects the vehicle front-side end portion of the right side rail placed on the one vehicle width direction side at a first end of the first coupling portion and a first end of the heat exchanger support lower member at a second end of the first coupling portion; and
   a second coupling portion that interconnects the vehicle front-side end portion of the left side rail placed on the other vehicle width direction side at a first end of the second coupling portion and a second end of the heat exchanger support lower member at a second end of the second coupling portion,
   wherein the first coupling portion is a member that is separate from the right side rail and the heat exchanger support lower member, a cross-section of the first coupling portion being different than a cross-section of the right side rail and a cross-section of the heat exchanger support lower member, and
   wherein the second coupling portion is a member that is separate from the left side rail and the heat exchanger support lower member, a cross-section of the second coupling portions being different than a cross-section of the left side rail and the cross-section of the heat exchanger support lower member.

2. The vehicle lower portion structure according to claim 1, wherein:
   the vehicle front-side end portion of the right side rail placed on the one vehicle width direction side is secured to the right front side member placed on the one vehicle width direction side,
   the vehicle front-side end portion of the left side rail placed on the other vehicle width direction side is secured to the left front side member placed on the other vehicle width direction side, and
   regions of the first and second coupling portions, between regions secured to the heat exchanger support lower member and regions secured to the side rails, are sloped outward in the vehicle width direction heading toward a vehicle rear side as seen in a vehicle plan view.

3. The vehicle lower portion structure according to claim 2, wherein:
   heat exchanger anchoring portions, to which part of the heat exchanger is anchored, are disposed at the heat exchanger support lower member, and the first ends of the first coupling portion and the second coupling portion are secured to regions of the heat exchanger support lower member that are adjacent to the heat exchanger anchoring portions.

4. The vehicle lower portion structure according to claim 2, wherein weak portions are formed in the regions of each of the first and second coupling portions, between the regions secured to the heat exchanger support lower member and the regions secured to the side rails.

5. The vehicle lower portion structure according to claim 4, wherein the weak portions are cored holes, bent portions, or cutout portions.

6. The vehicle lower portion structure according to claim 1, wherein the second ends of the first coupling portion and the second coupling portion are welded to the heat exchanger support lower member, and the first ends of the first coupling portion and the second coupling portion are respectively bolted to the right and left side rails.

7. The vehicle lower portion structure according to claim 1, wherein the suspension member includes a rear-side cross member which interconnects the right and left side rails in the vehicle width direction at rear-side regions of the right and left side rails.

* * * * *